US008617454B2

(12) United States Patent
Khami et al.

(10) Patent No.: US 8,617,454 B2
(45) Date of Patent: Dec. 31, 2013

(54) MANUFACTURE OF AN ACOUSTIC SILENCER

(71) Applicant: Ford Global Technologies, LLC, Dearborn, MI (US)

(72) Inventors: Roger Khami, Troy, MI (US); James William Ortman, Saline, MI (US); Brian Pierre Hendrix, Detroit, MI (US); Christopher Alan Myers, Holly, MI (US); Timothy Dorweiler, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/647,417

(22) Filed: Oct. 9, 2012

(65) Prior Publication Data

US 2013/0025780 A1 Jan. 31, 2013

Related U.S. Application Data

(62) Division of application No. 12/731,361, filed on Mar. 25, 2010, now Pat. No. 8,323,556.

(60) Provisional application No. 61/247,439, filed on Sep. 30, 2009.

(51) Int. Cl.
*B29C 49/06* (2006.01)

(52) U.S. Cl.
USPC ........... 264/537; 264/510; 264/512; 264/514; 264/523

(58) Field of Classification Search
None
See application file for complete search history.

(56) References Cited

U.S. PATENT DOCUMENTS

| | | | | |
|---|---|---|---|---|
| 5,397,517 | A | 3/1995 | Jay et al. | |
| 5,756,945 | A | 5/1998 | Maeda et al. | |
| 5,762,858 | A * | 6/1998 | Maeda et al. | 264/516 |
| 6,265,081 | B1 | 7/2001 | Urabe et al. | |
| 6,579,486 | B1 | 6/2003 | Nakajima et al. | |
| 6,715,580 | B1 | 4/2004 | Gerstner et al. | |
| 6,832,664 | B2 | 12/2004 | Stuart | |
| 6,866,812 | B2 | 3/2005 | Van Schaftingen et al. | |
| 6,938,601 | B2 | 9/2005 | Fukumoto | |
| 6,983,820 | B2 | 1/2006 | Boast et al. | |
| 7,086,497 | B2 | 8/2006 | Cole et al. | |

(Continued)

FOREIGN PATENT DOCUMENTS

| | | |
|---|---|---|
| JP | 53030660 | 3/1978 |
| JP | 61083020 | 4/1986 |
| JP | 3097521 | 4/1991 |

*Primary Examiner* — Monica Huson
(74) *Attorney, Agent, or Firm* — Julia Voutyras; Alleman Hall McCoy Russell & Tuttle LLP

(57) ABSTRACT

A method for manufacturing a resonator is disclosed in which a sleeve insert is placed into a fixture within a blow molding apparatus. The sleeve insert has a wall with a first plurality of apertures in the wall at a first axial distance and a second plurality of apertures in the wall at a second axial distance. A parison is slid over the sleeve insert; the mold is clamped over the parison causing the parison to press into the sleeve insert at three locations: near the ends of the sleeve insert and at a location between the pluralities of apertures; and air is blown into the sleeve insert, via a blow pin, to expand the parison into the walls of the mold to form cavities proximate the first and second pluralities of aperatures. After cooling, the mold opens to release the newly formed resonator.

3 Claims, 11 Drawing Sheets

(56) References Cited

U.S. PATENT DOCUMENTS

| | | | |
|---|---|---|---|
| 7,093,589 | B2 | 8/2006 | Sorersen et al. |
| 7,111,601 | B2 | 9/2006 | Moenssen et al. |
| 7,131,514 | B2 | 11/2006 | Choi et al. |
| 7,584,821 | B2 | 9/2009 | Prior et al. |
| 7,631,726 | B2 | 12/2009 | McWilliam et al. |
| 8,327,975 | B2 | 12/2012 | Ortman et al. |
| 2005/0150718 | A1 | 7/2005 | Knight et al. |
| 2007/0157598 | A1 | 7/2007 | Atanas et al. |
| 2008/0171163 | A1 | 7/2008 | Caviezel et al. |
| 2008/0236938 | A1 | 10/2008 | Pettipiece |
| 2010/0193282 | A1 | 8/2010 | Kim et al. |

* cited by examiner

MANUFACTURE OF AN ACOUSTIC SILENCER

CROSS REFERENCE TO RELATED APPLICATION

This is a divisional of, and claims the benefit of the filing date of, application Ser. No. 12/731,361 filed Mar. 25, 2010, now U.S. Pat. No. 8,323,556, which claims the benefit of U.S. provisional application Ser. No. 61/247,439 filed Sep. 30, 2009.

BACKGROUND

1. Technical Field

The present development relates to a resonator and the associated plumbing in an intake of an internal combustion engine to attenuate noise generated by an intake compressor and a method to manufacture the resonator.

2. Background Art

The compressor portion of an automotive turbocharger generates undesirable high frequency sound. An in-line silencer or resonator is typically provided to attenuate such frequencies. These acoustic devices are known to be made of a metallic duct with a metallic insert pressed inside the duct. The resonator is clamped or welded in a duct between the compressor and the engine. Such joints are susceptible to leaks and mechanical failures. Also, the press fit between the duct and insert allows some leakage and thus provides less than desirable attenuation characteristics. Furthermore, metallic duct work coupled to the resonator has limited flexibility and presents challenges to packaging within an engine compartment of a vehicle.

SUMMARY

To address at least one problem in the prior art, a resonator is disclosed which includes a sleeve insert sealingly coupled to an outer duct at first and second ends of the inner sleeve. The sleeve insert has a first aperture at a first axial distance along the sleeve insert, a second aperture at a second axial distance along the sleeve insert, and a rib extending radially outwardly. The rib is located between the first and second apertures. The outer duct is also sealingly coupled to the sleeve insert at the rib.

The resonator has a first annular cavity formed between the sleeve insert and the outer duct at a location proximate the first aperture and a second annular cavity formed between the sleeve insert and the outer duct at a location proximate the second aperture. The first cavity is fluidly coupled to the sleeve insert via the first aperture or first apertures. The second cavity is fluidly coupled to the sleeve insert via the second aperture or second apertures.

In one embodiment, the outer duct seals with the sleeve insert via o-rings placed on the sleeve insert proximate the first and second ends. In some embodiments, the sleeve insert has grooves into which the o-rings are placed.

In some other embodiments without o-rings, the sleeve insert has barbs on both ends of the sleeve insert to provide additional surface area to facilitate the coupling between the sleeve insert and the outer duct. The rib, in some embodiments, has a pointed tip to engage with the outer duct to promote a robust coupling. In some embodiments, greater surface area for promoting coupling between the sleeve insert and the outer duct is provided by features sitting proud of the surface such as X's, dots, circles, or any other suitable feature. The rib is distinguished from a barb in that the rib extends outwardly from the sleeve insert at least 0.1 times the diameter of the sleeve insert; whereas, the barbs are smaller bumps extending outwardly, mainly provided to increase the surface area of contact. The rib extends outwardly from the sleeve insert less than the inside diameter of the sleeve insert. In the embodiment in which the sleeve insert is a plate, the rib extends away from the plate a distance less than an inside diameter of the outer duct. That inside diameter is defined at a location away from where the plate is installed. The amount that the rib extends from the sleeve insert depends on the size of the cavities. If the cavity is large, the outer duct is caused to blow out farther to create the cavity and the rib extends outwardly to meet the outer duct at the location between the two cavities. By having a rib on the sleeve insert, the bending radius on the outer duct is reduced considerably.

The rib presents an advantage by largely obviating pinching of the outer duct when the outer duct is pressed by the mold to meet the rib of the sleeve insert. This prevents stretching, wrinkling, and/or cracking of the parison when being pressed into the sleeve insert between the first and second apertures.

First and second cavities are formed on either side of the rib in the vicinity of first and second pluralities of apertures in the sleeve insert. In one embodiment, the cavities are roughly annular in cross section. In another embodiment, an outer edge of at least one of the cavities is non-circular to facilitate packaging. For example, it may be advantageous to have a portion of the resonator fit tightly against an inner wall and thus to have a flat surface.

In the context of an air intake system for an internal combustion engine, the resonator, in some embodiments, can be coupled to a flexible cuff which is coupled to an outlet of the compressor. Alternatively, the resonator can be coupled to an inlet of the compressor via a flexible cuff or other suitable coupler.

To overcome at least one problem in the prior art, a method for manufacturing a resonator, according to one embodiment of the disclosure, includes placing a sleeve insert onto a fixture within an open mold of a blow molding apparatus. In one embodiment, a blow pin is integrated into the fixture. Next, a parison is slipped over the entire length of the sleeve insert. The mold is clamped over the parison and air is blown into the sleeve insert through the blow pin. The mold pinches the parison into the sleeve insert at three axial pinch points. In an alternative embodiment, the fixture does not include the blow pin. Instead, the blow pin is part of the mold apparatus. In some embodiments, the sleeve insert is heated proximate the three pinch points to promote adherence between the sleeve insert and the parison. In other embodiments, preheating was not used and sealing was accomplished via mechanical interference. In an alternative embodiment, an o-ring is placed on the sleeve insert proximate one or more of the pinch points on the sleeve insert prior to sliding the parison over the sleeve insert. When sufficiently cool, the resonator is released by opening the mold. The resonator includes the sleeve insert and the parison.

In some embodiments, the sleeve insert is produced by an injection molding process. The sleeve insert is generally shaped as a duct and has at least one aperture in a side wall of the duct at a first axial distance and at least one aperture in the side wall at a second axial distance. In some embodiments, the sleeve insert has a first plurality of apertures at a first distance along the sleeve insert, a second plurality of apertures at a second distance along the sleeve insert, a rib extending radially outwardly from the sleeve insert at a location in between the first and second pluralities of apertures, and at least one barb extending outwardly from the sleeve insert proximate at a first end of the sleeve insert and at least one barb extending outwardly from the sleeve insert at a second end of the sleeve insert. Clamping of the mold causes the parison to couple with the sleeve insert at three locations: the barb at the first end of the sleeve insert, the barb at the second end of the sleeve insert, and the rib. In some embodiments, the first and second pluralities of apertures are slots.

In some embodiments, the sleeve insert is made of a plastic material with a higher melting temperature than the plastic material from which the parison is made. Alternatively, the two have similar melting temperatures. An advantage of the higher melting temperature of the sleeve insert is that it retains its shape during the molding of the parison over the sleeve insert. An advantage of the two having similar melting temperature is that the sleeve insert melts, and thus adheres, with the parison during the overmolding process. In some embodiments, the two materials have a similar coefficient of expansion.

An advantage according to an embodiment of the disclosure is that due to the parison being slid over the entire length of the sleeve insert, the couplings between the two are internal to the parison (or outer duct). Thus, if issues with sealing develop, there is no leakage to the outside.

Another advantage according to some embodiments, is that by preheating the sleeve insert in the vicinity of the coupling points, the material is brought to its melting point so that the parison and the sleeve insert weld together when clamped by the mold. This provides a better seal than a press fit.

Yet another advantage, according to some embodiments, is that a plastic duct can be bent to a tighter radius than a metallic duct. The resonator can be formed with ducts on one or both ends with relatively tight turns to facilitate packaging. By forming a resonator with integral ducts, the number of connections is minimized. Connections can potentially leak or fail. Connections require a clamp or a process such as a weld to couple the two pieces being connected. Fewer connections lower the cost and increase the reliability of the duct system.

A resonator, according to an embodiment of the present disclosure, can have a single cavity located at one distance from a resonator end. In many applications, however, the range of compressor whine frequencies that lead to customer dissatisfaction is not adequately attenuated by a single cavity. Two cavities can be provided, a first of which is at a first distance along the sleeve insert and a second of which at a second distance. Furthermore, apertures which fluidly couple the sleeve insert to the first cavity have a different geometry than apertures fluidly coupling the second cavity with the sleeve insert. The first cavity attenuates frequencies primarily at one side of the frequency range and the second cavity attenuates frequencies primarily at the other side of the frequency range. The present disclosure can be extended to three or more cavities to provide even more effective noise attenuation over a broad range of frequencies.

It is common to provide a resonator downstream of the compressor. Alternatively, noise can be attenuated by having the resonator located upstream of the compressor.

In one embodiment, the compressor is a portion of a turbocharger. The turbocharger houses the compressor and an exhaust turbine, which are coupled via a shaft. In another embodiment, the compressor is a supercharger which is coupled to an output shaft of the engine via a clutch or a belt off the engine. The compressor can be any suitable type.

An advantage of the present disclosure is that by blow molding the parison over the sleeve insert, the cavities, in embodiments with multiple cavities, are sealed from each other on the exterior surface of the sleeve insert. It has been found, as will be described in regards to FIG. 15, that noise attenuation is improved when the cavities are sealed from each other compared with a system in which the inside sleeve is press fit within the outer duct, i.e., the surfaces abut each other, but do not provide a seal.

By making the resonator of plastic instead of metal, the weight of the resonator is reduced from about 200 grams to about 125 grams (for a prototype resonator). An actual production resonator will likely be less than 125 grams when optimized to provide the minimum necessary wall thicknesses. Additional weight loss is realized in a duct system with a plastic resonator because the upstream and downstream ducts are also made of plastic parts. Furthermore, the plastic-to-plastic connections, such as between the resonator and the ducts to which it is coupled can be achieved by welding or overmolding, which obviates the need for a clamp as used in metallic resonator systems.

The cost of the plastic part is about one-half that of a comparable part made from metal. There are additional savings in part count and labor by eliminating the clamps from the duct system.

The duct system, according to an embodiment of the present disclosure includes (from upstream to downstream): a compressor, a flexible cuff, an upstream duct, a resonator, a downstream duct, and an intercooler. The duct system with a metallic resonator includes the same elements, except without an upstream duct. The flexible cuff, in the system with the metallic resonator, is much longer than the flexible cuff according to an embodiment of the disclosure because any tighter bends in the system on the upstream side of the resonator must be included in the flexible cuff, as a metallic duct cannot be bent very tightly. As disclosed, the flexible cuff can be short and the remaining length upstream of the resonator is taken up by the upstream duct. This reduces system weight and cost. In some embodiments, the upstream duct is formed integrally with the resonator. Furthermore, a portion, or all, of the downstream duct can be integrally formed with the resonator.

Packaging can be exceedingly challenging in engine compartments with turbochargers and the ancillary plumbing. Another advantage of using a plastic resonator is that the resonator can readily be formed without radial symmetry. The resonator includes a sleeve insert and a blow molded duct. The blow molded duct has two bulges extending outwardly which defines cavities in between the sleeve insert and the blow molded duct. These bulges, in particular, can be difficult to package. However, the mold into which the parison is placed to form the blow molded duct can be flat on one side. By molding a flat on one side, the resonator can be abutted with a flat surface. Another, non-limiting example, would be to make the bulges in the resonator square in cross section and making line contact with the sleeve insert at the center of the sides of the square. In such an example, each bulge represents four cavities extending outward at the points of the square.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
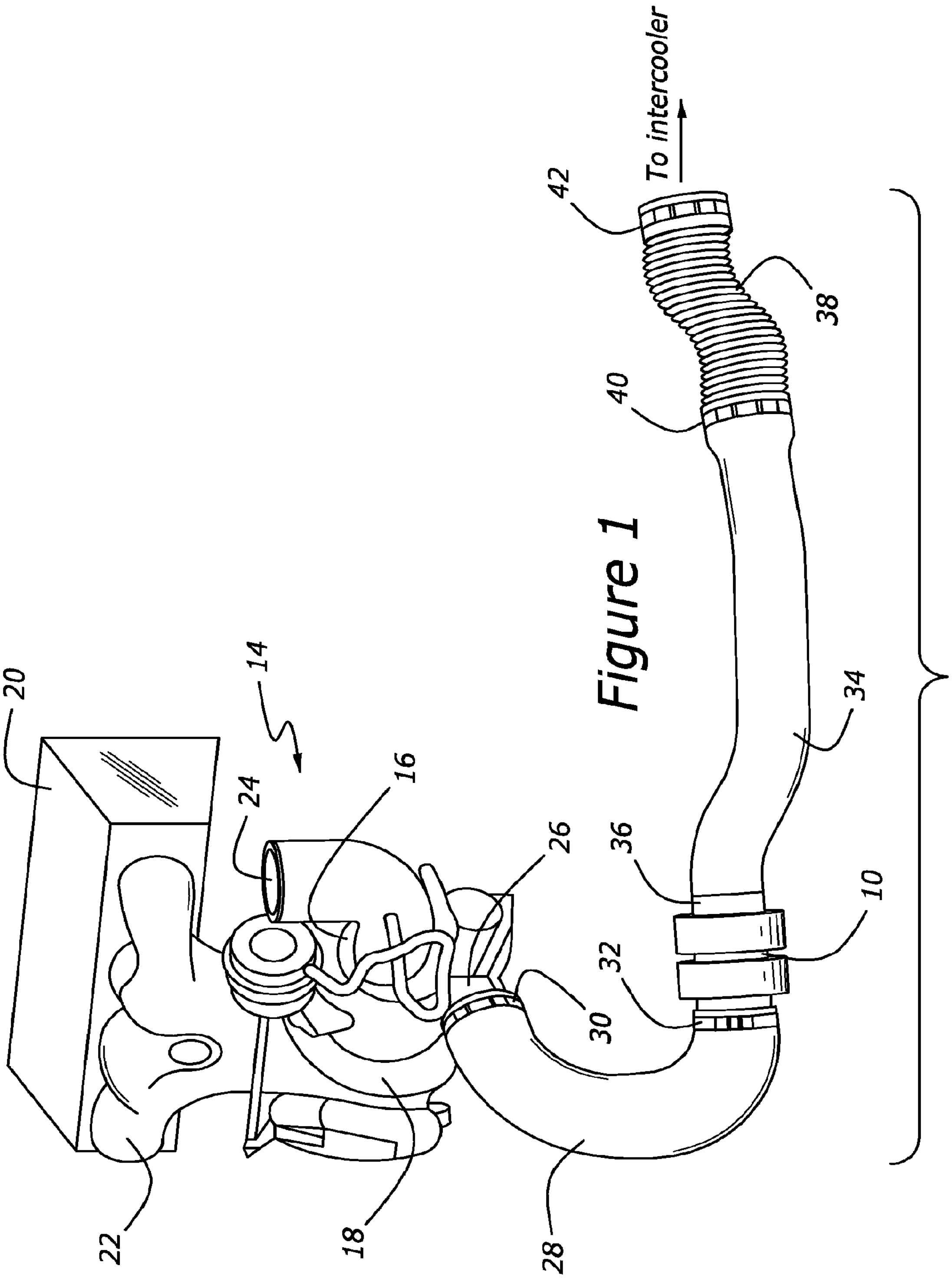
FIG. 1 shows a portion of an engine showing the turbocharger and ducting relating to a metallic resonator.

In FIG. 1, a metal resonator 10 and duct system 12 is shown. A turbocharger 14 includes a compressor 16 and an exhaust turbine 18 in a single housing. Exhaust turbine 18 is driven by exhaust gases which exit a cylinder head 20 and are furnished to exhaust turbine 18 through an exhaust manifold 22. Compressor 16 is provided fresh air through a compressor inlet 24. Compressor 16 feeds compressed air out a compressor outlet 26 and then, in some embodiments, through an intercooler (not shown) before entering an internal combustion engine (not shown). The plumbing between compressor 16 and the intercooler includes: a flexible cuff 28 coupled to the compressor outlet by a clamp 30, the metallic resonator 10 coupled to flexible cuff 28 by a clamp 32, a downstream metallic duct 34 coupled to the metallic downstream duct via a weld joint 36. The example shown in FIG. 1 includes a flexible hose 38 just upstream of the intercooler which includes an additional two clamps 40 and 42. In FIG. 1, the downstream side of resonator 10 is coupled to metallic duct 34 on the downstream side by weld joint 36. In some applications, it is desirable to couple a plastic downstream duct in place of metallic duct 34 to reduce weight and cost of duct system 12. However, to do so, a short section of flexible tubing is used to couple a plastic duct to resonator 10, which would add two additional clamps to the system.

Figure 2:
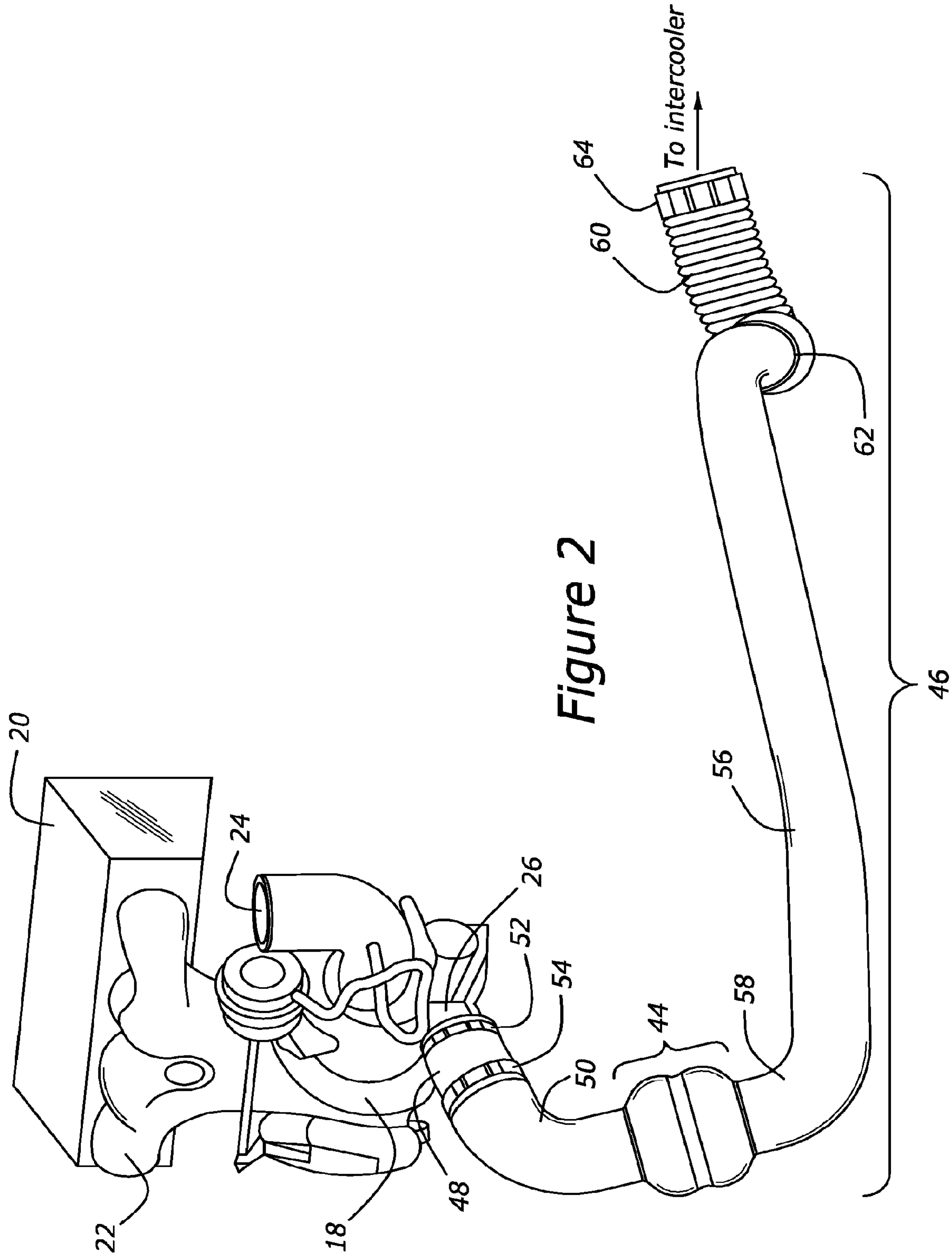
FIG. 2 shows a portion of an engine showing the turbocharger and ducting relating to a plastic resonator.

An embodiment of the disclosure is shown in FIG. 2, in which a resonator 44 of plastic is part of a duct system 46 between compressor outlet 26 and an intercooler (not shown). In the embodiment of FIG. 2, a flexible cuff 48 is coupled between compressor outlet 26 and resonator 44. Resonator 44, being made of plastic, has a bend 50 in the upstream side. Because resonator 44 is molded of plastic, bend 50 can be formed integrally with resonator 44. A metallic resonator, in contrast, cannot be bent as tightly. Consequently, flexible cuff 48 is significantly shorter than flexible cuff 48 of FIG. 1. Clamps 52 and 54 are used to couple flexible cuff 48 between compressor outlet 26 and resonator 44. Resonator 44 is coupled closer to compressor outlet 26 than resonator 10 of FIG. 1. There are additional advantages in replacing much of the length of the flexible cuff by plastic: reduced weight and cost.

In the embodiment shown in FIG. 2, a downstream duct 56 is coupled to resonator 44 by a joint 58. Joint 58 is indistinguishable from duct 56 and the downstream section of resonator 44 because the joint is formed by spin welding or overmolding, as examples, which obviates the need for a clamp system. Alternatively, resonator 44 is coupled in a normal manner using a clamp system. Depending on the application and the packaging constraints, in an alternate embodiment, resonator 44 extends from flexible cuff 48 to a flexible hose 60. Flexible hose 60 has upstream clamp 62 and downstream clamp 64 coupling to the intercooler.

Flexible cuff 48 of FIG. 2 is significantly shorter than flexible cuff 28 of FIG. 1. This is because the plastic upstream duct coupled to flexible cuff 48 includes a significant bend. A metal duct cannot be readily bent in such a tight curve without undergoing deformation that would restrict flow. It is possible to have a system with a short flexible cuff, followed by a plastic duct, and then a metallic resonator. However, this requires additional clamps and connection sections, which are susceptible to leakage. Thus, duct system 46 is advantageous over duct system 12 for reducing the length of the flexible cuff and/or minimizing clamped connections.

Figure 3:
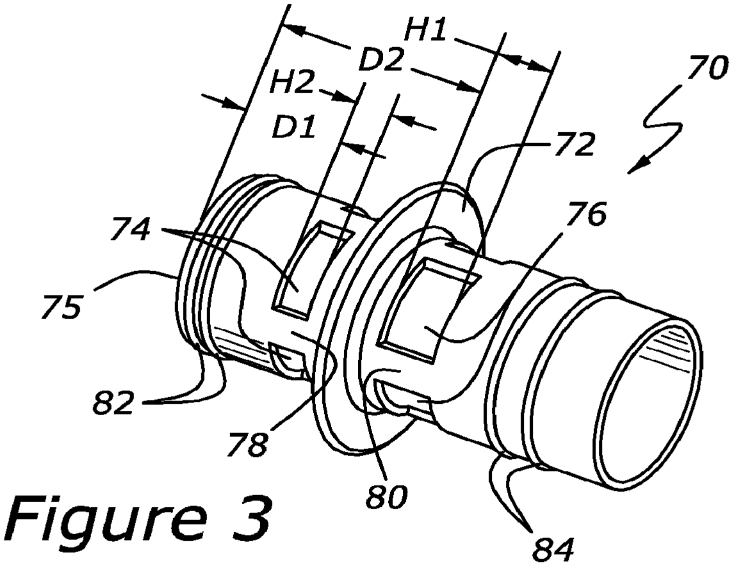
FIG. 3 is a sleeve insert according to an embodiment of the present disclosure.

A sleeve insert 70, as shown in FIG. 3, has a tubular wall with a rib 72 extending radially outwardly from the wall. On one side of rib 72 is a first plurality of apertures 74 located around the periphery of sleeve insert 70 at a first distance, D1, from an end 75 of sleeve insert 70. On the other side of rib 72 is a second plurality of apertures 76 around the periphery of sleeve insert 70 at a second distance, D2, from end 75 of sleeve insert 70. Apertures 74 and 76 have heights, H1 and H2. The heights of the apertures affect the damping characteristics of resonator 70, particularly the frequency ranges that the resonator 70 attenuates. The design of apertures 74 and 76 is based on the application to which the resonator is applied. However, in automotive applications, a range if 5 to 25 mm is expected with apertures 74 and 76 being different in height. In some embodiments with three pluralities of apertures, three different heights are provided. Bridges 78 and 80 provided between the apertures are sufficiently large to maintain a desired strength of sleeve insert 70 and to provide sufficient channel area to allow material flow during the injection molding process. Barbs 82 and 84 are provided on the outside surface of sleeve insert 70 to provide a greater surface area when a blow-molded duct is overmolded with sleeve insert 70 in the region of barbs 82 and 84. Rib 72 may have a pointed tip to provide a more secure connection with the blow-molded duct (not shown in FIG. 3) than might otherwise be formed with a square end on rib 72.

Figure 4:
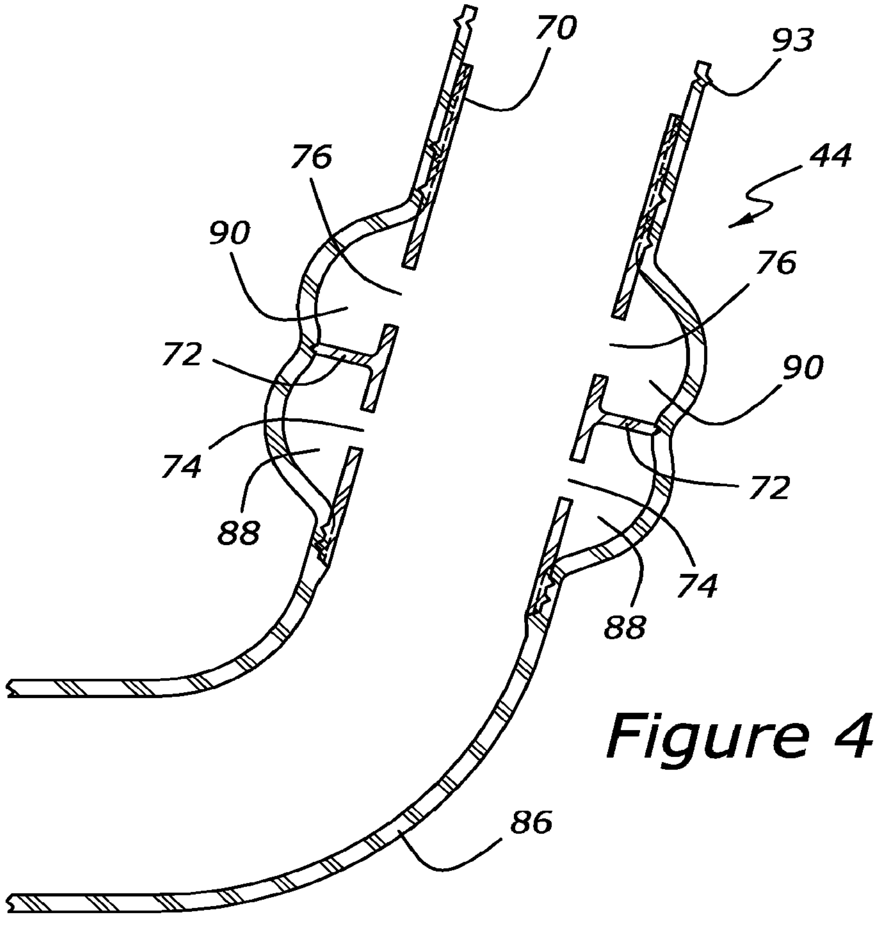
FIG. 4 is a cross section of a sleeve insert with an outer duct blow molded over the sleeve insert according to an embodiment of the present disclosure.
Figure 5:
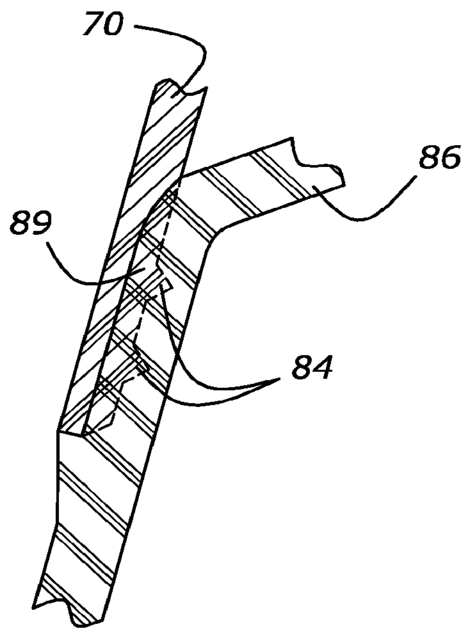
FIG. 5 is a detail of the coupling joint between the sleeve insert and the blow-molded duct of FIG. 4.
Figure 6:
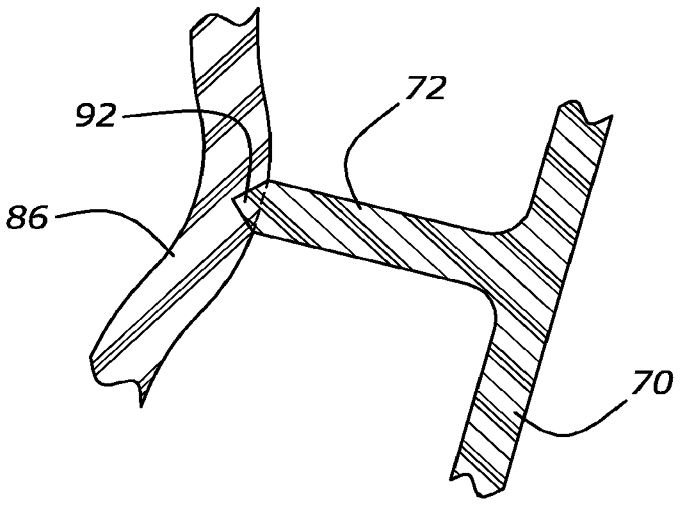
FIG. 6 is a sleeve insert according to an embodiment of the present disclosure.

A cross-section of sleeve insert 70 is shown in FIG. 4 with a blow-molded duct 86 over sleeve insert 70. First and second cavities 90 and 88, shown in cross section in FIG. 4, form tori around sleeve insert 70. The shape and volume of cavities 90 and 88, along with the aperture geometry, affect the attenuation characteristics of the resonator. In some embodiments, the cavities have different volumes; in other embodiments, the cavities are substantially similar in volume. For automotive applications, it is expected that the volumes are in the range of 10 to 250 cubic centimeters, with a typical one being about 50 cubic centimeters. The tip of rib 72 forms a seal with an interior surface of blow-molded duct 86. Blow-molded duct 86 couples to sleeve insert 70 near both ends of sleeve insert 70 in the region of the barbs (not readily recognizable in FIG. 4). A detail of a portion of sleeve insert 70 and blow-molded duct 86 where they join is shown in FIG. 5. Blow-molded duct 86 couples with sleeve insert 70 at barbs 84 on sleeve insert 70. As shown in FIG. 5, sleeve insert 70 and blow-molded duct 86 melt together and form a weld portion 89. A detail of the coupling between rib 72 and the blow-molded duct is shown in FIG. 6. A pointed tip on rib 72 facilitates the connection between the two elements in FIG. 6. In the embodiment shown in FIG. 6, the tip of rib 72 is pointed and forms a weld connection 92.

Referring again to FIG. 4, outer duct 86 of sleeve inert 44 has a barb 93 at one end. In one embodiment the barb facilitates connection with a flexible coupling, which is not shown in this Figure.

Figure 7:
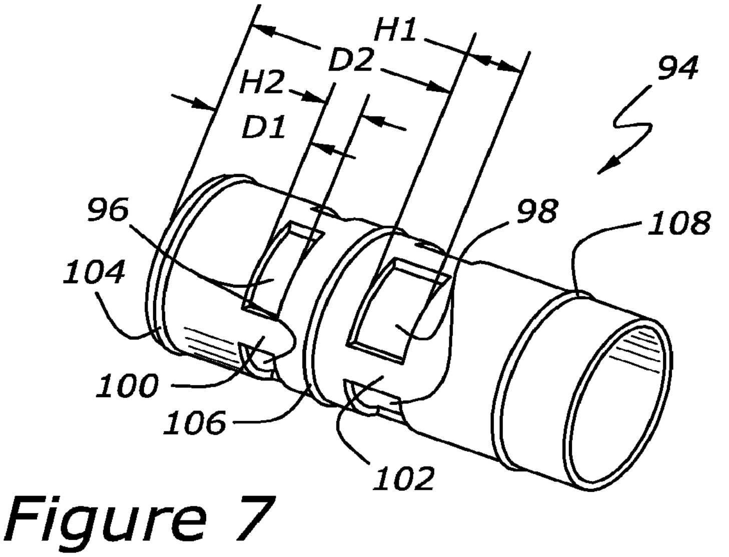
FIG. 7 is a cross section of a sleeve insert with an outer duct blow molded over the sleeve insert according to an embodiment of the present disclosure in which the sealing is accomplished using o-rings.
Figure 8:
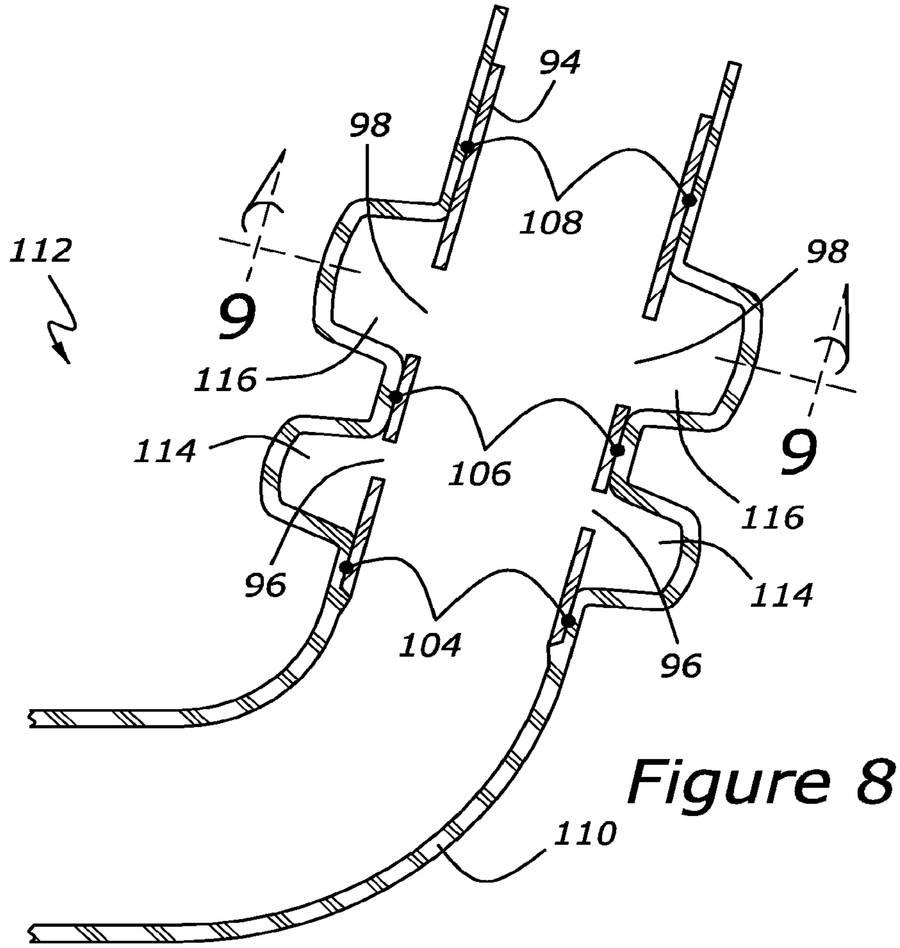
FIG. 8 is a detail of the coupling joint between the sleeve insert and the blow-molded duct of FIG. 7.

In FIG. 7, an alternative sleeve insert 94 is shown, which does not include a rib or barbs. Sleeve insert 94 has apertures 96 and 98 and bridges 100 and 102 for maintaining support of sleeve insert 94. In this embodiment, o-rings 104, 106, and 108 are placed on the outer surface of sleeve insert 94, fitted into grooves on the surface of sleeve insert 94 (not visible in FIG. 7 due to o-rings in grooves). In FIG. 8, blow-molded duct 110 is shown in cross section coupled with sleeve insert 94 to form resonator 112. First and second cavities 114 and 116 are formed behind apertures 96 and 98. In the manufacturing process, blow-molded duct 110 is pinched into sleeve insert 94 in the regions of o-rings 104, 106, and 108 to seal first and second cavities 114 and 116 so that fluidic communication from the interior of sleeve insert 94 to first and second cavities 114 and 116 is provided only through apertures 96 and 98, respectively. One advantage of sleeve insert 94 over sleeve insert 70 is that relying on o-rings to provide the seal is not dependent on achieving temperatures in the sleeve insert and the blow-molded duct to promote bonding. However, o-rings add cost and must be installed into grooves. An advantage of resonator 44 over resonator 112 is that blow-molded duct 86 has much larger radius bends than blow-molded duct 110. With tight radius bends, there is the concern that thinning of the walls of the blow-molded duct 110 may occur. One solution is to move first and second cavities 114, 116 farther apart so that bends are less aggressive, with the concomitant disadvantage that it lengthens the resonator in the region of the bulges for the cavities. Another solution is to thicken the wall of blow-molded duct to ensure that it is thick enough in the region with tight radius bends, but with the disadvantage of cost of material and component weight.

An advantage of a plastic insert sleeve and a plastic blow-molded duct is that the expansion characteristics are nearly identical between the two. In alternative embodiments, the plastic sleeve insert can be made by blow molding, injection molding, or machining. Injection molding results in a part with tighter tolerances than with blow molding. With blow molding, machining operations may be used to obtain the desired internal dimension and to provide the apertures in the walls. However, it is difficult to completely remove all machining debris. Such debris could cause damage if inducted into the engine.

In some embodiments, the insert sleeve is formed of a metal, which may have the same thermal expansion characteristics of the outer duct.

Figure 9:
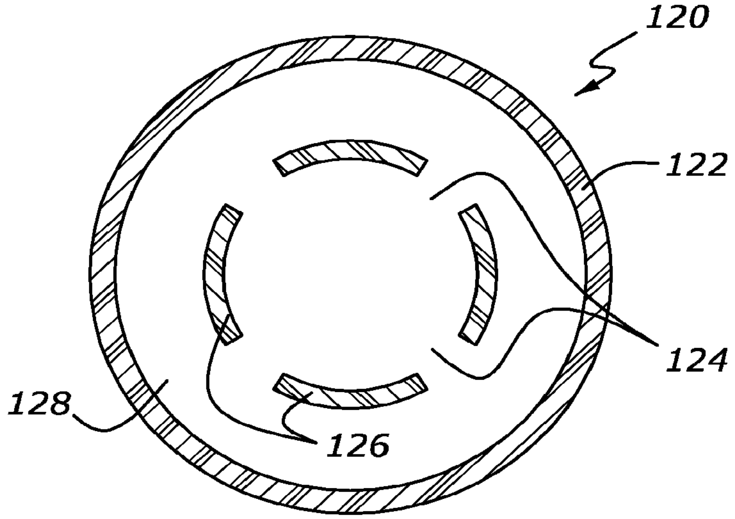
FIGS. 9 and 10 are slices of a resonator in the vicinity of the apertures according to embodiments of the present disclosure.
Figure 10:
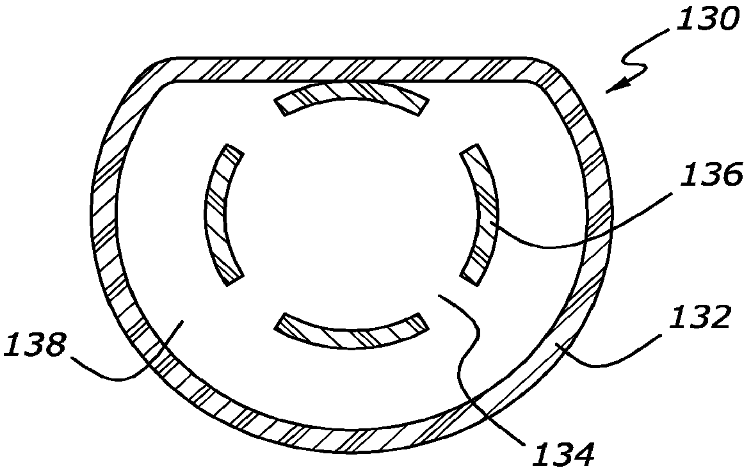

FIG. 9 shows a slice through a resonator 120 according to an embodiment of the disclosure. Blow-molded duct 122 has a sleeve insert within. As the slice is taken through apertures 124, only a section of bridges 126 of sleeve insert are shown. Blow-molded duct 122 is substantially circular so that cavity 128 is substantially annular in the slice shown in FIG. 9. In FIG. 10, an alternative embodiment of a resonator 130 is shown in which blow-molded duct 132 is flat on one side such that one of bridges 136 touches blow-molded duct 132. The resulting cavity 138 is no longer symmetrical. The examples shown in FIGS. 9 and 10 are only two such examples. A duct having a cross section with two flat sides, an oval, and a square, or any suitable shape can be employed.

Figure 11A:
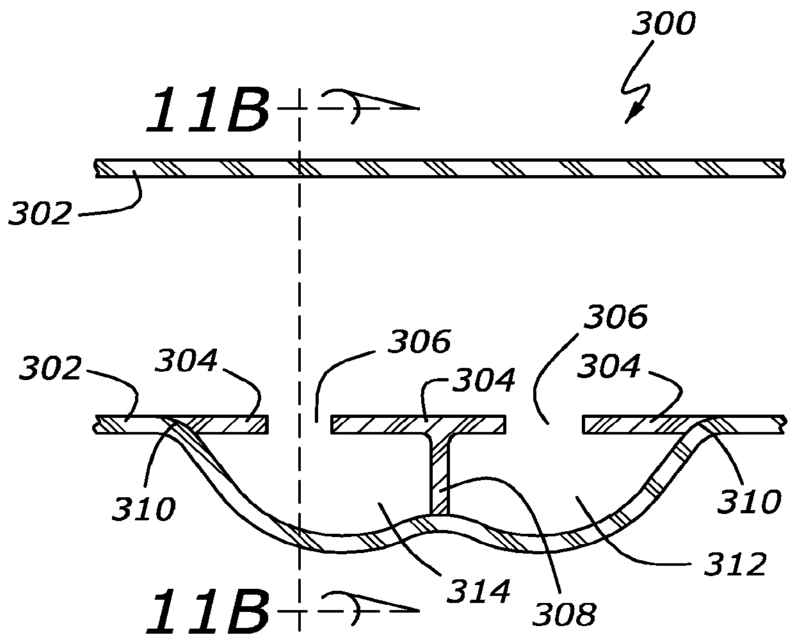
FIG. 11A is a view showing a slice of an embodiment of the present disclosure in which the sleeve insert is a wall.
Figure 11B:
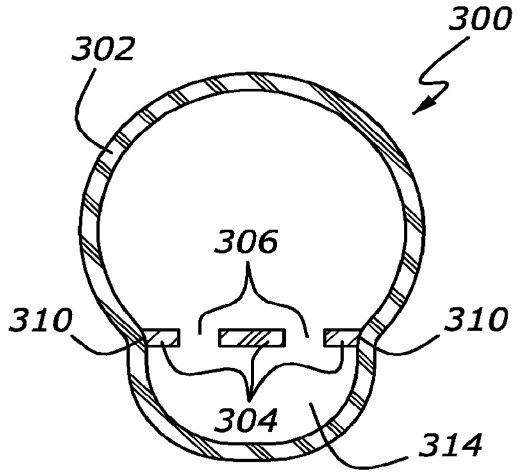
FIG. 11B is an alternative slice of the embodiment shown in FIG. 11A.

In the embodiments described above, the sleeve insert is tubular. However, in an alternative embodiment, the sleeve insert is a plate, such as shown in FIG. 11A. A resonator 300 has an outer duct 302 with a plate 304. In one embodiment, plate 304 has a rib 308 extending outwardly. Plate 304 has at least one aperture 306 on each side of rib 308. Cavities 312 and 314 are formed in bulges in outer duct 302. In an alternative embodiment, plate 304 does not have such a rib 308 and outer duct 302 meets sleeve inert by bending inwardly. Plate 304 is coupled to outer duct 302 at locations 310 In FIG. 11B, an alternative slice of resonator 300 is shown. Outer duct 302 has plate 304 extending across a portion of outer duct 302 coupling at locations 310 and forming cavity 314. Plate 304 has at least one aperture. Two apertures 306 are shown in FIG. 11B. The sleeve insert is a flat plate, with a rib extending from one side in FIGS. 11A and 11B. In other embodiments, the plate assumes a dish shape, a bow, or any other suitable shape.

Figure 12:
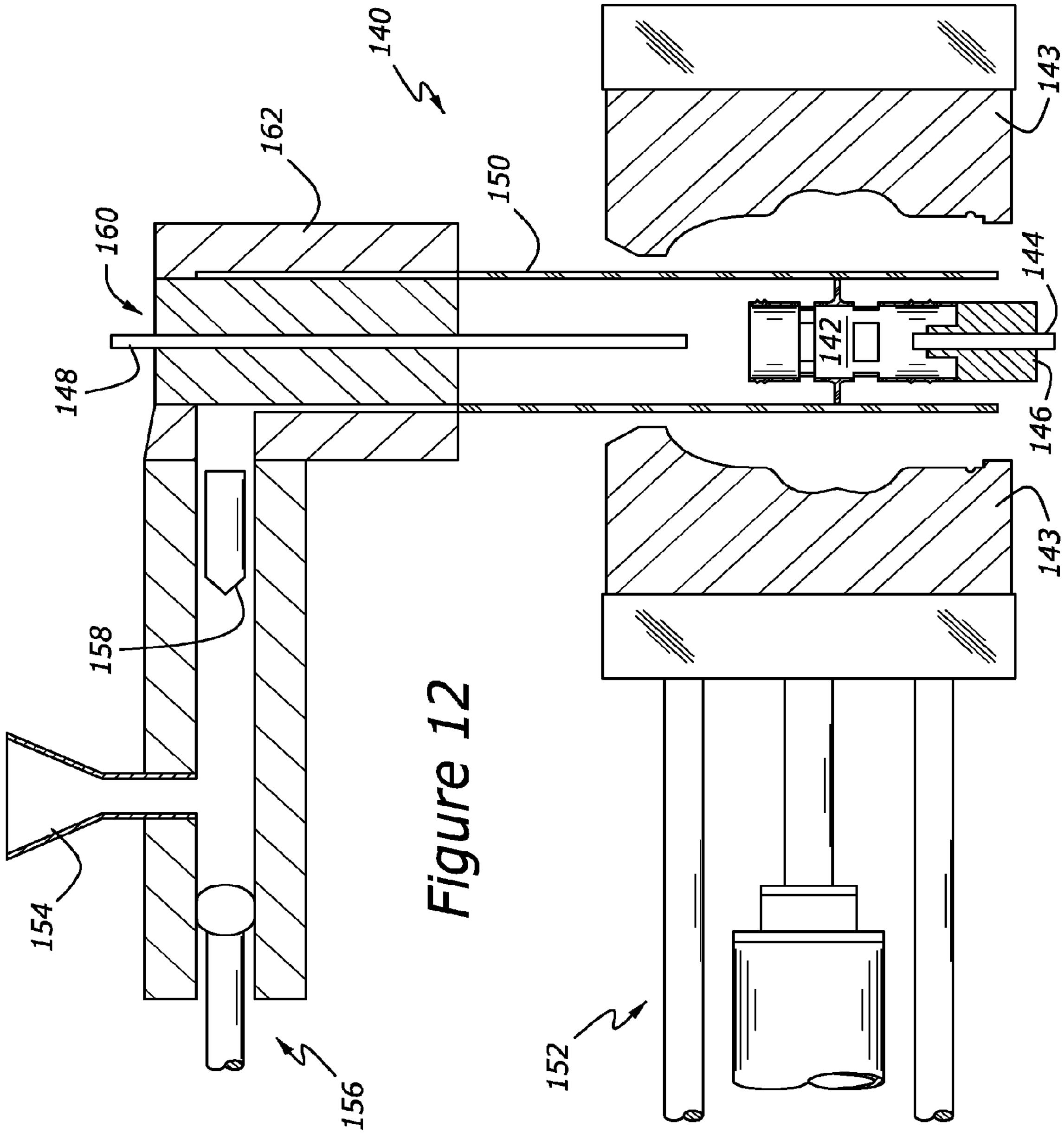
FIGS. 12 and 13 are schematic representations of a blow-molding process by which a resonator according to an embodiment of the present disclosure can be manufactured.

In FIG. 12, an example of a blow-molding system 140 is shown in cross section. As described above, the sleeve insert is produced by injection molding or other process prior to the blow-molding process. A finished sleeve insert 142 is placed within a mold 143 when the mold in an open position, such as that shown in FIG. 12. Sleeve insert 142 is slid over a blow pin 144 and/or holding fixture 146. A second blow pin 148 from the top may also or alternatively be provided. A parison 150 is formed from heated plastic and slid over sleeve insert 142. Sleeve insert 142 is provided with a rib extending outwardly and apertures at two axial distances and barbs proximate both ends of sleeve insert 142.

Blow-molding system 140 also includes a pneumatic or hydraulic system which controls the open/close position of mold 143. Blow-molding system includes a hopper 154, a pneumatically-driven (or hydraulically) extruder 156, a torpedo 158, a mandrel 160 and a die head 162. The working of blow-molding system 140 is known in the art and not discussed further herein.

Figure 13:
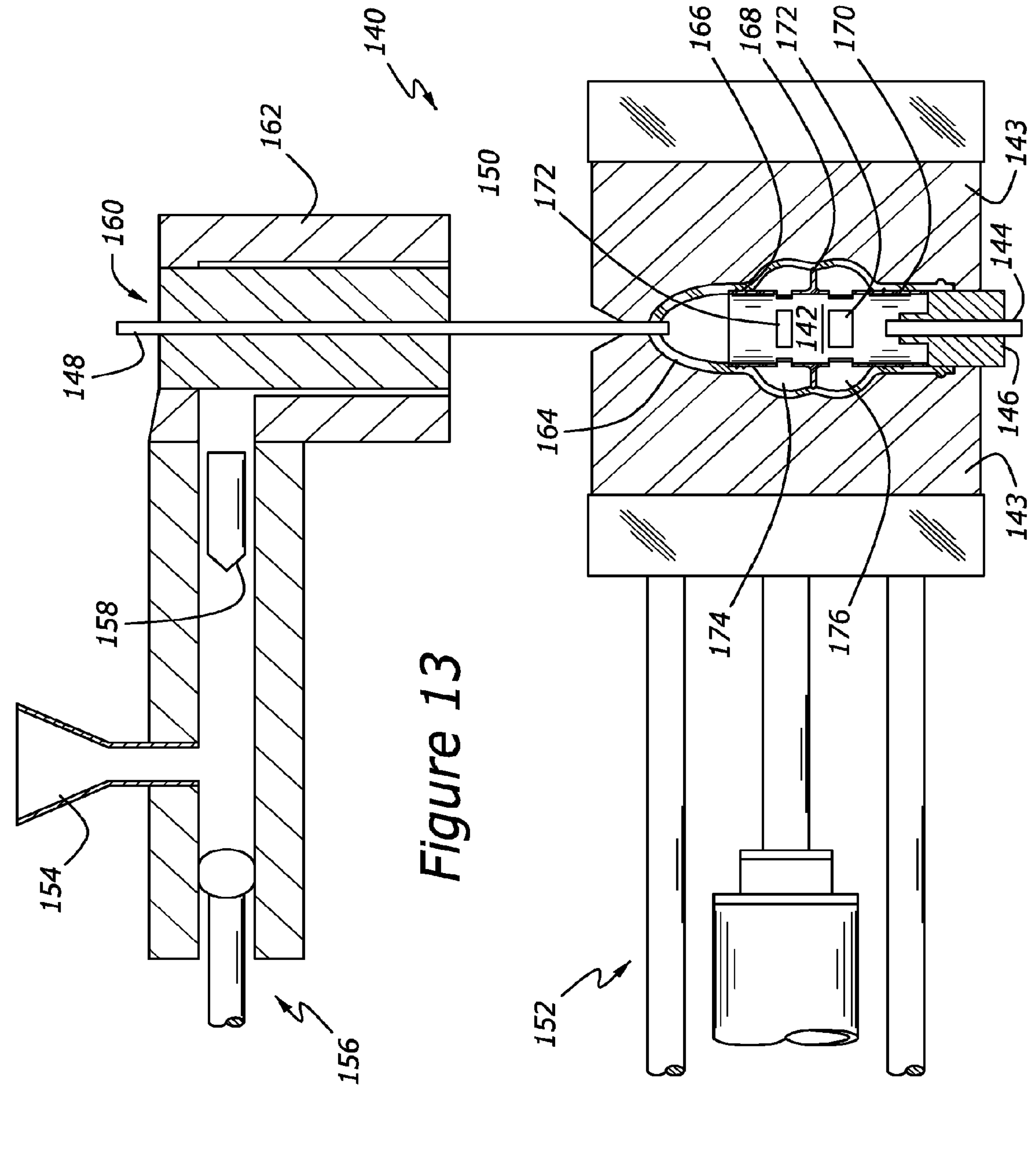

In FIG. 13, mold 143 is shown in a closed position. The shape of the mold causes parison to pinch at three locations 166, 168, and 170, which correspond with the barbs at the ends of sleeve insert 142 and at the rib of sleeve insert 142. Inflation air, or other gas, is blown through one or both of blow pins 144, 148. Air pressure passes through apertures 172 leaving sleeve insert 142 unaffected, but acts upon molten parison 164 to cause it to assume the shape of mold 143. In particular, first and second cavities 174, 176 are formed between sleeve insert 142 and parison 164. The coupling joints of sleeve insert 142 melt into parison 164 to seal at regions 166, 168, and 170. Upon cooling, parison 164 can now be called an outer duct or blow-molded duct. Outer duct 164 is now coupled with sleeve insert 142 to form a resonator. The resonator shown in FIG. 13 doesn't extend beyond sleeve inert 142 very far in either direction. In other embodiments, a longer parison and more extensive mold is provided such that the resulting resonator contains bends and much more of the duct length of the duct system.

Figure 14:
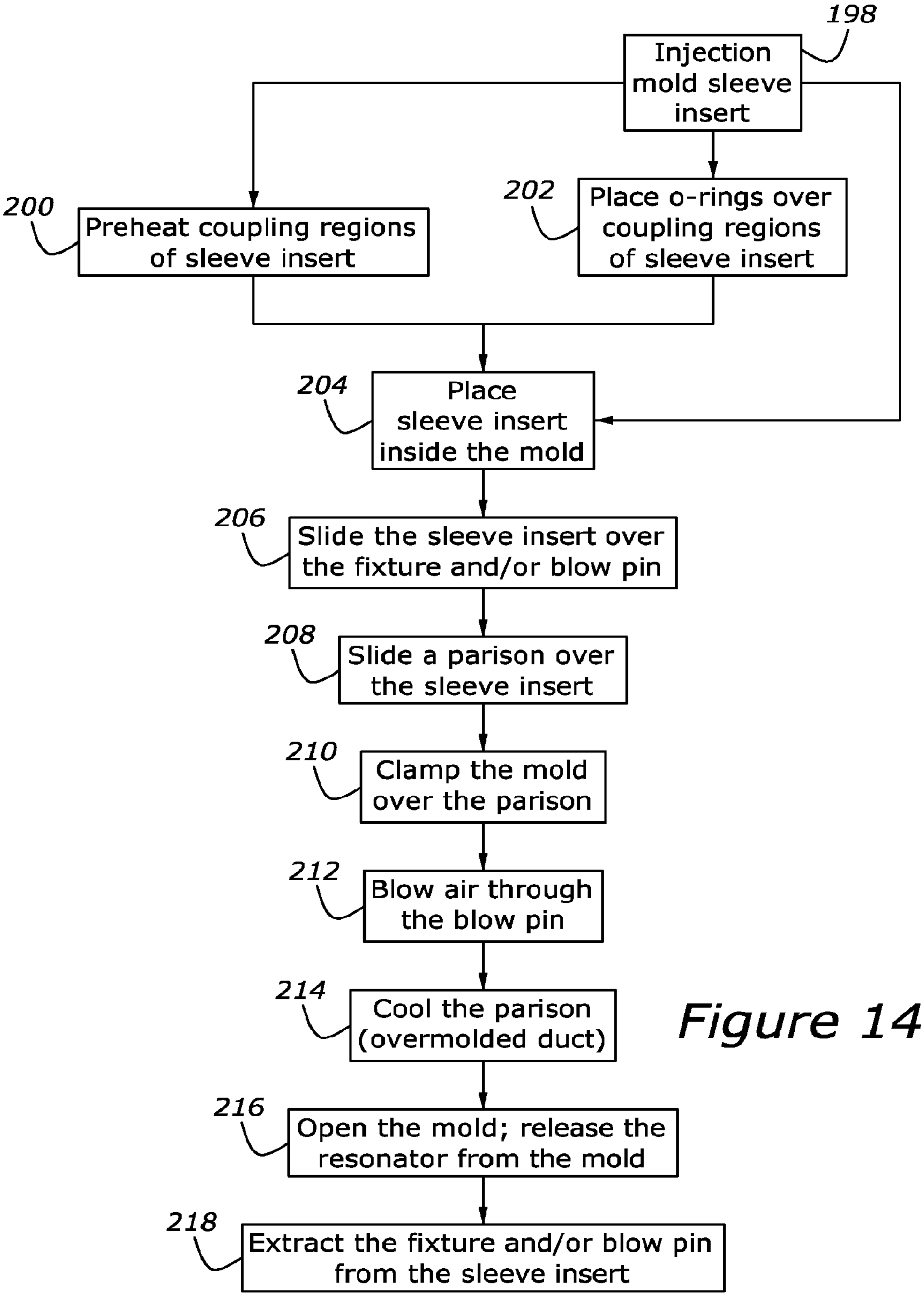
FIG. 14 is a flowchart for manufacturing a resonator.

In FIG. 14, a flowchart for forming a resonator according to embodiments of the disclosure is shown. In step 198, a sleeve insert is formed by injection molding. In one embodiment, the sleeve insert is heated at the coupling regions 200. The entire sleeve insert can be preheated either before or after insertion into the mold. The sleeve insert can be heated by a ceramic heater, an infrared heater, or any suitable heater. The piece is preheated to promote welding between the sleeve insert and the outer duct. In an alternative embodiment, o-rings are placed over the sleeve insert in the coupling regions 202. In such embodiment, no preheat is used. In other embodiments, the sleeve insert is not preheated prior to placing in the blow-molding apparatus with block 204 following block 198. In any case, sleeve insert is placed in the mold 204 and slid over a fixture 206. In some embodiments, the fixture also includes a blow pin. A parison is slid over the sleeve insert 208. The mold is closed 210 thereby clamping down on the parison at the pinch points. Then air is provided through the blow pin(s) 212. The air accesses the parison via the apertures in the sleeve insert. The air blown through the blow pin causes the parison to assume the shape of the mold. The parison is cooled 214 so that its shape becomes fixed. Upon cooling, the parison is now the blow-molded or outer duct, which is coupled with the sleeve insert to form the resonator. When the resonator is sufficiently cool, the sleeve insert coupled to the blow-molded duct, now the resonator, is released by opening the mold 216. The fixture is then extracted from the sleeve insert 218.

Referring again to FIGS. 3 and 4, there are many details about the design of the sleeve insert and the blow-molded duct that affect the attenuation of the resonator. In FIG. 3, the apertures are rectangular slots. Alternatively, the apertures are of any other suitable shape, such as ovals, and triangles. In one alternative, the larger window-like apertures of FIG. 3 are replaced by an array of perforations. In such a situation with an array of perforations, the distance of the apertures along the length of the sleeve insert can be defined as a geometric center of the perforations. The distance between the apertures is another factor that can affect the attenuation characteristics of the resonator. The first and second volumes contained within the first and second cavities 88, 90 of FIG. 4 also affect the attenuation characteristics. Typically, an acoustic model is employed to determine the appropriate values of the various parameters to obtain the desired attenuation characteristics based on the intended application.

The cavities can be modeled as Helmholtz resonators. There are well known idealized equations from which the frequency at which the Helmholtz resonator attenuates sound can be computed. However, it is known, to those skilled in the art, that the actual frequency at which sound is attenuated by such a resonator is different than what is computed by the idealized equations due to inertia effects. It is known to compute an end correction length to more accurately determine the actual frequency range of attenuation. There are many papers in the literature directed toward determining end corrections appropriate for Helmholtz resonators for various geometries. An end corrected length is substituted in the idealized Helmholtz equations for the uncorrected length to determine the frequency range of attenuation. An end correction for the particular geometry of the disclosed resonator is not shown in the prior art. Such a relationship is disclosed herein, where: $Lend=a*h^b$, in which Lend is the end corrected length; h is the height of the aperture; and a and b are constants that are determined empirically. For example, for a resonator on a 50 mm main diameter, a slot height of 5 mm, a cavity volume of 66 ml, and a neck length of 2.3 mm (thickness of the material in which the apertures are formed), the frequency range of attenuation peaked at 3930 Hertz, when applying the Helmholtz equations without correction. When applying the end corrected length, the frequency peaks at 2300 Hertz, which is within 100 Hertz of the peak in attenuation found experimentally.

Figure 15:
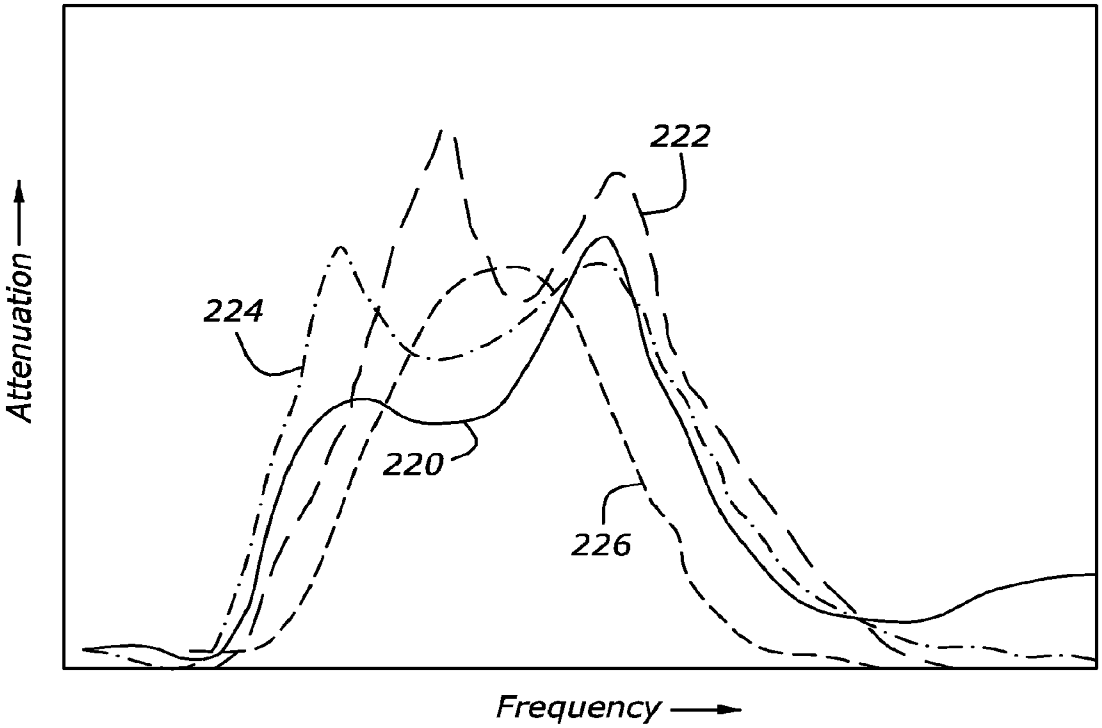
FIG. 15 is a graph of the noise attenuation as a function of frequency for three resonator designs.

Referring now to FIG. 15, attenuation characteristics as a function of frequency is shown for: a two-cavity, metallic resonator 220; a first two-cavity, plastic resonator 222; a second two-cavity plastic resonator 224; and a single-cavity, plastic resonator 226. The two-cavity resonators 220, 222, 224 provide two peaks of attenuation. A wider range of frequencies are attenuated by two-cavity resonators than the single-cavity resonator 226. The metallic resonator provides much less attenuation than the two plastic resonators, which is believed to be due to the fact that the sleeve insert of the metallic resonator is press fit within the outer duct and fails to provide an adequate seal. One of the advantages of the resonator, according to one embodiment, is that the cavities are sealingly coupled to the blow-molded duct. The two distinct plastic resonator designs indicate how the choice of design parameters provides different attenuation characteristics. One plastic resonator provided more noise reduction in a lower frequency range 224 than the other 222 with the tradeoff of providing less attenuation in the region of the lower frequency peak. The volumes of the two cavities are typically different to provide the wider range in frequency attenuation desired.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:

1. A method for attaching a resonator to an airflow, comprising:

(A) forming the resonator comprising:

forming a sleeve insert having: a wall, a first aperture in the wall at a first axial distance, a second aperture in the wall at a second axial distance, and a rib having a proximal end at the wall of the sleeve insert and extending outwardly from the wall and terminating at a distal end vertically displaced from the wall, the rib being located between the first and second apertures; and inserting the formed sleeve insert into an outer duct;

bonding the outer duct to the sleeve insert to points on the sleeve insert wall at first and second ends of the sleeve insert and at the distal end of the outwardly extending end of the rib vertically displaced from the points on the sleeve insert wall and with ends of the outer duct extending outwardly beyond ends of the sleeve insert forming the resonator with: a first toroidal cavity disposed between the sleeve insert and the outer duct at a location proximate the first aperture, the first aperture providing an entrance to an interior region of the first toroidal cavity; a second toroidal cavity disposed between the sleeve insert and the outer duct at a location proximate the second aperture, the second aperture providing an entrance to an interior region of the second toroidal cavity; and the outwardly extending rib forming a common sidewall separating the interior region of the first toroidal cavity from the interior region of the second toroidal cavity;

(B) coupling the one of the outwardly extending ends of the outer duct of the resonator to the exhaust manifold.

2. The method recited in claim 1 wherein an entrance to the first toroidal cavity is formed with a different size than an entrance to the second toroidal cavity.

3. A method for attaching a resonator to an airflow, comprising:

(A) forming the resonator comprising:

forming a sleeve insert having: a wall, a first aperture in the wall at a first axial distance, a second aperture in the wall at a second axial distance, and a rib having a proximal end at the wall of the sleeve insert and extending outwardly from the wall and terminating at a distal end vertically displaced from the wall, the rib being located between the first and second apertures; and inserting the formed sleeve insert into an open mold of a blow molding apparatus;

sliding a parison over an entire length of the sleeve insert;

clamping the mold over the parison wherein the mold pinches the parsion into the sleeve insert at three axial pinch points, a first one and second one of the pinch points being on the wall and a third one of the pinch points being at the distal end of the rib, the proximal end of the rib being between the the first one and second one of the pinch points;

blowing a gas into the sleeve insert to bond the parison to the sleeve insert to the three axial pinch points, and with ends of the outer duct extending outwardly beyond ends of the sleeve insert forming the resonator with: a first toroidal cavity disposed between the sleeve insert and the outer duct at a location proximate the first aperture, the first aperture providing an entrance to an interior region of the first toroidal cavity; a second toroidal cavity disposed between the sleeve insert and the outer duct at a location proximate the second aperture, the second aperture providing an entrance to an interior region of the second toroidal cavity; and the outwardly extending rib forming a common sidewall separating the interior region of the first toroidal cavity from the interior region of the second toroidal cavity; and (B) coupling the one of the outwardly extending ends of the parison to the exhaust manifold.

* * * * *